(12) United States Patent
Kim et al.

(10) Patent No.: US 11,514,650 B2
(45) Date of Patent: Nov. 29, 2022

(54) ELECTRONIC APPARATUS AND METHOD FOR CONTROLLING THEREOF

(71) Applicant: Samsung Electronics Co., Ltd., Suwon-si (KR)

(72) Inventors: Yongsung Kim, Suwon-si (KR); Daehyun Ban, Suwon-si (KR); Dongwan Lee, Suwon-si (KR); Hongpyo Lee, Suwon-si (KR); Lei Zhang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/080,296

(22) Filed: Oct. 26, 2020

(65) Prior Publication Data
US 2021/0166486 A1 Jun. 3, 2021

(30) Foreign Application Priority Data
Dec. 3, 2019 (KR) .......................... 10-2019-0159394

(51) Int. Cl.
*G06T 19/00* (2011.01)
*G06K 9/00* (2022.01)
(Continued)

(52) U.S. Cl.
CPC .......... *G06T 19/006* (2013.01); *G06K 9/6256* (2013.01); *G06N 3/08* (2013.01);
(Continued)

(58) Field of Classification Search
CPC ............... G06F 2111/18; G06F 3/0481; G06F 3/04817; G06F 9/4443; G06F 3/04847;
(Continued)

(56) References Cited

U.S. PATENT DOCUMENTS 6,088,017 A * 7/2000 Tremblay .............. G06F 3/0484
345/156
8,253,649 B2 8/2012 Imai et al.
(Continued)

FOREIGN PATENT DOCUMENTS

CN 109993108 A 7/2019
JP 2018-110871 A 7/2018
(Continued)

OTHER PUBLICATIONS

International Search Report and written opinion dated Feb. 10, 2021, issued in International Application No. PCT/KR2020/014721.

(Continued)

*Primary Examiner* — Todd Buttram
(74) *Attorney, Agent, or Firm* — Jefferson IP Law, LLP

(57) ABSTRACT

An electronic apparatus is provided. The electronic apparatus includes a display, a camera configured to capture a rear of the electronic apparatus facing a front of the electronic apparatus in which the display displays an image, and a processor configured to render a virtual object based on the image captured by the camera, based on a user body being detected from the captured image, estimate a plurality of joint coordinates with respect to the detected user body using a pre-trained learning model, generate an augmented reality image using the estimated plurality of joint coordinates, the rendered virtual object, and the captured image, and control the display to display the generated augmented reality image, wherein the processor is configured to identify whether the user body touches the virtual object based on the plurality of estimated joint coordinates, and change a transmittance of the virtual object based on the touch being identified.

16 Claims, 10 Drawing Sheets

(51) Int. Cl.
*G06T 7/50* (2017.01)
*G06K 9/62* (2022.01)
*G06T 7/70* (2017.01)
*G06N 3/08* (2006.01)
*G06V 40/10* (2022.01)

(52) U.S. Cl.
CPC .................. *G06T 7/50* (2017.01); *G06T 7/70* (2017.01); *G06V 40/107* (2022.01); *G06T 2207/20081* (2013.01); *G06T 2207/20084* (2013.01); *G06T 2207/30196* (2013.01)

(58) Field of Classification Search
CPC .... G06F 11/3664; G06F 3/012; G06F 3/0304; G06F 3/011–015; G06K 9/00664–00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 10,082,879 | B2 | 9/2018 | Niinuma et al. |
| 10,134,166 | B2 | 11/2018 | Benishti et al. |
| 10,665,019 | B2 | 5/2020 | Hildreth et al. |
| 2012/0068913 | A1* | 3/2012 | Bar-Zeev ............ G02B 27/0172 345/8 |
| 2012/0249590 | A1* | 10/2012 | Maciocci ............ G06T 15/503 345/633 |
| 2014/0306891 | A1 | 10/2014 | Latta et al. |
| 2017/0140552 | A1 | 5/2017 | Woo et al. |
| 2018/0024641 | A1* | 1/2018 | Mao .................... G06K 9/00389 382/103 |
| 2018/0285636 | A1* | 10/2018 | Fei ...................... G06K 9/00375 |
| 2019/0087011 | A1* | 3/2019 | Kim ........................ G06T 19/20 |
| 2019/0206119 | A1* | 7/2019 | Nam ...................... G06T 19/006 |
| 2019/0294258 | A1* | 9/2019 | Forlines ................. G06F 3/0235 |
| 2019/0339773 | A1* | 11/2019 | Holbery .................. G06F 3/014 |
| 2020/0356235 | A1* | 11/2020 | Arimatsu .............. G06F 3/0346 |
| 2020/0372716 | A1* | 11/2020 | Murata .................. G06F 3/0304 |
| 2021/0117663 | A1* | 4/2021 | Mori ........................ G06F 3/014 |
| 2021/0200301 | A1* | 7/2021 | Yokoyama .............. G06T 11/00 |

FOREIGN PATENT DOCUMENTS

| | | |
|---|---|---|
| JP | 6518931 B1 | 5/2019 |
| KR | 10-2010-0027976 A | 3/2010 |
| KR | 10-1687017 B1 | 12/2016 |
| KR | 10-2018-0097949 A | 9/2018 |
| WO | 2018/071225 A1 | 4/2018 |

OTHER PUBLICATIONS

Kim et al., "Touch and hand gesture-based interactions for directly manipulating 3D virtual objects in mobile augmented reality", Feb. 22, 2016.
Qi et al., "Resolving Occlusion for 3D Object Manipulation with Hands in Mixed Reality", VRST '18, Nov. 28-Dec. 1, 2018.
Extended European Search Report dated Aug. 19, 2022, issued in European Patent Application No. 20897014.5.

\* cited by examiner

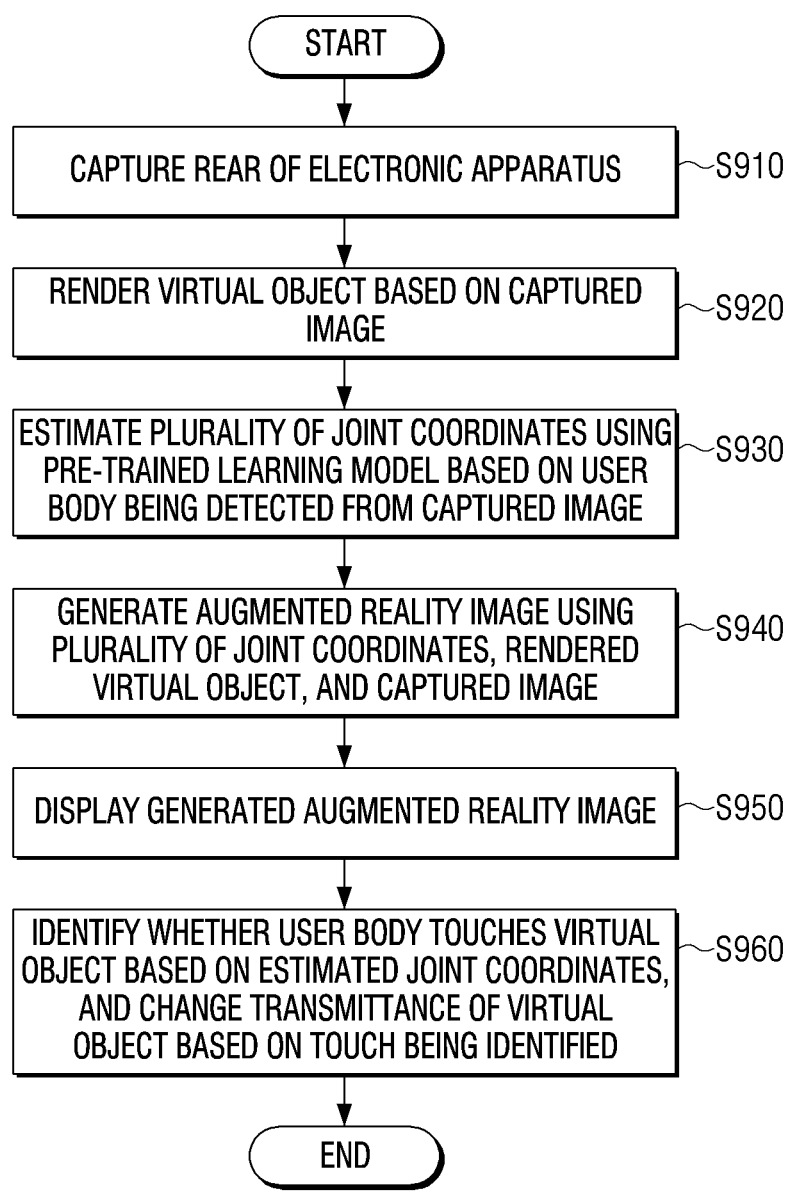

ELECTRONIC APPARATUS AND METHOD FOR CONTROLLING THEREOF

CROSS-REFERENCE TO RELATED APPLICATION(S)

This application is based on and claims priority under 35 U.S.C. § 119(a) of a Korean patent application number 10-2019-0159394, filed on Dec. 3, 2019 in the Korean Intellectual Property Office, the disclosure of which is incorporated by reference herein in its entirety.

BACKGROUND

1. Field

The disclosure relates to an electronic apparatus and method for controlling thereof. More particularly, the disclosure relates to an electronic apparatus that renders a virtual object on an image captured by a camera, and displays an AR image using the rendered virtual image and the captured image, and a method for controlling thereof.

2. Description of the Related Art

Augmented reality (AR) technology is a technology that superimposes a 3D virtual image on a real image or background and displays it as a single image. The AR technology is being used in various ways in everyday life, such as not only video games but also smartphones, a head-up display (HUD) on windshield of vehicle, or the like.

However, in the case of the AR technology, an image is output by superimposing a virtual object on an image received by a camera, but there has been a problem in that even when a user's hand is closer to the camera than a virtual object, the virtual object is formed on the user's hand so that the user hand is seen to be farther away from the camera than the virtual object.

In addition, the AR technology has a problem in that a plurality of cameras must capture a user and a space from various viewpoints for interaction between the user and a virtual object. Also, a high-performance equipment was required to process an image captured by the plurality of cameras in real time.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or advantages and to provide at least the advantages described below. Accordingly, aspects of the disclosure is to provide an electronic apparatus configured to render a virtual object on an image captured by one camera, and display an augmented reality image by using the rendered virtual object and the captured image, and a method of controlling thereof.

Additional aspects will be set forth in part in the description which follows and, in part, will be apparent from the description, or may be learned by practice of the presented embodiments.

In accordance with an aspect of the disclosure, an electronic apparatus is provided. The apparatus includes a display, a camera configured to capture a rear of the electronic apparatus facing a front of the electronic apparatus in which the display displays an image, and a processor configured to render a virtual object based on the image captured by the camera, based on a user body being detected from the captured image, estimate a plurality of joint coordinates with respect to the detected user body using a pre-trained learning model, generate an augmented reality image using the estimated plurality of joint coordinates, the rendered virtual object, and the captured image, and control the display to display the generated augmented reality image, wherein the processor is configured to identify whether the user body touches the virtual object based on the estimated plurality of joint coordinates, and change a transmittance of the virtual object based on the touch being identified.

The processor may be configured to estimate a plurality of joint coordinates corresponding to a finger joint and a palm using the pre-trained learning model based on the detected user body being identified to be a hand.

The processor may be configured to render a virtual hand object and the virtual object based on the estimated plurality of joint coordinates.

The processor may be configured to change a transmittance of one area of the virtual object corresponding to the touch.

The processor may be configured to change a transmittance of the user body and transparently display the user body based on the touch being identified.

The processor may be configured to receive depth data of the captured image from the camera, and generate the augmented reality image using the received depth data.

The pre-trained learning model may be configured to be trained through a plurality of learning data including hand images by using a convolutional neural network (CNN).

The plurality of learning data may be configured to include a first data in which a 3D coordinate is matched to at least one area of the hand image, and a second data in which the 3D coordinate is not matched to the hand image, and the pre-trained learning model is configured be trained by updating a weight value of the CNN based on the first data and the second data.

In accordance with another aspect of the disclosure, a method of controlling an electronic apparatus is provided. The method includes capturing a rear of the electronic apparatus facing a front of the electronic apparatus in which a display displays an image, rendering a virtual object based on a captured image, based on a user body being detected from the captured image, estimating a plurality of joint coordinates with respect to the detected user body using a pre-trained learning model, generating an augmented reality image using the estimated plurality of joint coordinates, the rendered virtual object, and the captured image, displaying the generated augmented reality image, identifying whether the user body touches the virtual object based on the estimated plurality of joint coordinates, and changing a transmittance of the virtual object based on the touch being identified.

The estimating may include estimating a plurality of joint coordinates corresponding to a finger joint and a palm using the pre-trained learning model based on the detected user body being identified to be a hand.

The rendering may include rendering a virtual hand object and the virtual object based on the estimated plurality of joint coordinates.

The changing may include changing a transmittance of one area of the virtual object corresponding to the touch.

The method may further include changing a transmittance of the user body and transparently displaying the user body based on the touch being identified.

The generating may include receiving depth data of the captured image from the camera, and generating the augmented reality image using the received depth data.

The pre-trained learning model may be configured to be trained through a plurality of learning data including hand images by using a convolutional neural network (CNN).

The plurality of learning data may be configured to include a first data in which a 3D coordinate is matched to at least one area of the hand image, and a second data in which the 3D coordinate is not matched to the hand image, and wherein the pre-trained learning model is configured be trained by updating a weight value of the CNN based on the first data and the second data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a flowchart illustrating a method of controlling an electronic apparatus according to an embodiment of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "include", and "may include" used in the embodiments of the disclosure indicate the presence of corresponding features (for example, elements such as numerical values, functions, operations, or parts), and do not preclude the presence of additional features.

In addition, the disclosure describes components necessary for disclosure of each embodiment of the disclosure, and thus is not limited thereto. Accordingly, some components may be changed or omitted, and other components may be added. In addition, they may be distributed and arranged in different independent devices.

Hereinafter, the disclosure will be described in more detail with reference to the drawings.

Figure 1:
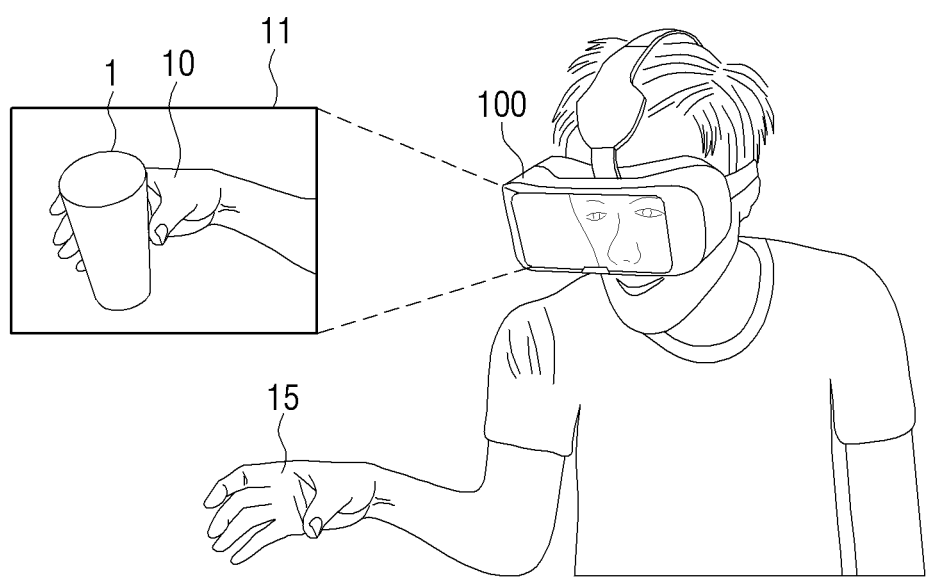
FIG. 1 is a view illustrating an operation of an electronic apparatus according to an embodiment of the disclosure.

FIG. 1 is a view illustrating an operation of an electronic apparatus according to an embodiment of the disclosure.

Referring to FIG. 1, a user wears an electronic apparatus 100 and the user interacts with a virtual object 1 using an Augmented reality (AR) image 11 displayed on the electronic apparatus 100.

The electronic apparatus 100 is a device including a camera and a display. As shown in FIG. 1, the electronic apparatus 100 may be implemented in a form of wearable augmented reality (AR) glasses that can be worn by a user. Alternatively, as an embodiment, it may be implemented as at least one of a display apparatus, a smartphone, a laptop PC, a laptop computer, a desktop PC, a server, a camera device, and a wearable device including a communication function.

The electronic apparatus 100 may provide the AR image 11 to the user using a display, and the electronic apparatus 100 may capture a rear of the electronic apparatus 100 facing a front of the electronic apparatus 100 in which the display displays an image by using a camera to move the user's hand 15, thereby interacting the virtual object 1 with the user body 10.

The AR image 11 is an image provided by the electronic apparatus 100 through a display, and may display the user body 10 and the virtual object 1. In addition, the camera included in the electronic apparatus 100 captures a space where the user exists, and the AR image 11 may provide an object and a surrounding environment that are actually exist to the user through the captured image.

A display is disposed on the front of the electronic apparatus 100 to provide the AR image 11 to the user, and a camera is disposed on the rear of the electronic apparatus 100 to capture the user's surroundings and the user body. According to an embodiment of the disclosure, since the electronic apparatus 100 captures the user's surroundings and the user body depending on a direction of the user's gaze, that is, a first person perspective, and provides an image generated based on the perspective, the electronic apparatus 100 may provide a realistic AR image.

According to an embodiment of the disclosure, the electronic apparatus 100 may include a camera. The electronic apparatus 100 may guarantee real-time performance of image processing and may not require a high-performance device by using a single camera. The electronic apparatus 100 may estimate 3D coordinates of the user body by using a pre-trained learning model even when only a portion of the user body (e.g., hand) is captured. In addition, the electronic apparatus 100 may estimate an exact location and motion of the user body despite using a single camera, and based on this, may provide a service capable of interacting with a virtual object to the user.

Figure 2:
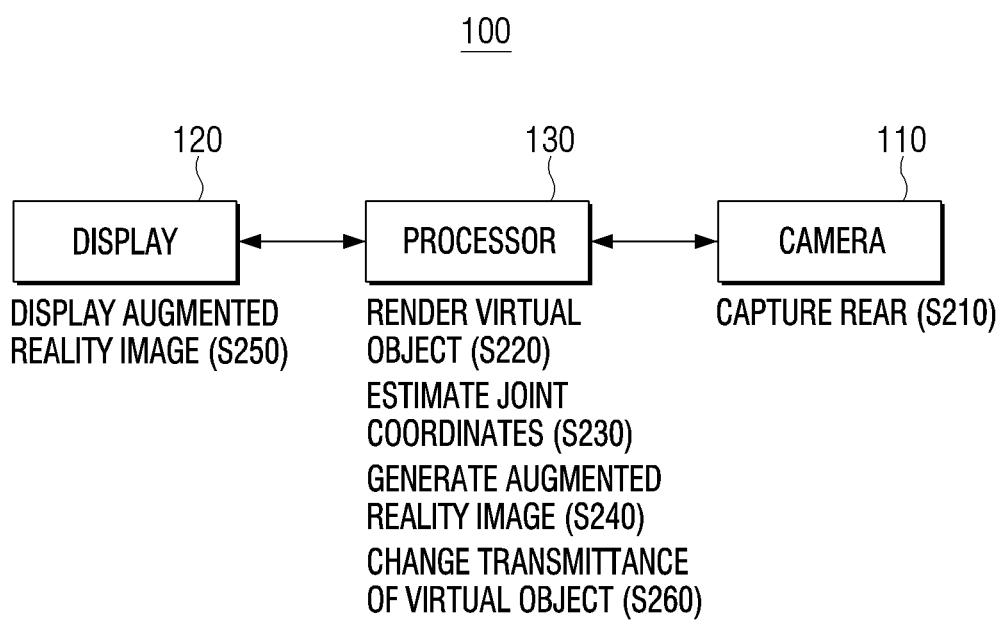
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

Referring to FIG. 2, the electronic apparatus 100 may include a camera 110, a display 120, and a processor 130.

The camera 110 may capture the rear of the electronic apparatus facing the front of the electronic apparatus 100 in which the display 120 displays an image (S210). The camera 110 may capture a space where the user exists and the user body. The camera 110 may be disposed on the rear or side of the electronic apparatus 100 to capture the rear of the electronic apparatus 100. The camera 110 is disposed on the rear or side of the electronic apparatus 100, but the electronic apparatus 100 may be implemented as a wearable glass AR device or a smartphone, etc. as illustrated in FIG. 1. Thus, the camera 110 may capture an image with a variable direction depending on the user's movement and the user's gaze.

In addition, the electronic apparatus 100 may be connected to the processor 130 in a wired or wireless communication method. The image captured by the camera 110 may be provided to the user in real time after a series of processing by the processor 130. In addition, the image captured by the camera 110 may be used as a basis for generating an AR image by the processor 130 described below. The image captured by the camera 110 may be an RGB image including RGB data. Alternatively, according to another embodiment of the disclosure, the camera 110 may be a 3D camera capable of acquiring depth data. The processor 130 may acquire the depth data from the image captured by the camera 110, and use the acquired depth data as a basis for generating an AR image.

The display 120 may be disposed in front of the electronic apparatus 100. In addition, the display 120 may be connected to the processor 130 by wired or wireless, and the display 120 may display various information under the control of the processor 130. In particular, the display 120 may display an AR image generated by the processor 130 (S250). Since the display 120 displays the AR image generated based on the image captured by the camera 110 disposed on the rear of the electronic apparatus 100, the AR image displayed by the display 120 may be a first person perspective image.

In addition, the display 120 may be implemented in a form of a general display such as a Liquid Crystal Display (LCD), a Light Emitting Diode (LED), an Organic Light Emitting Diode (OLED), a Quantum dot Light Emitting Diode (QLED), etc., and according to another embodiment, the display 120 may also be implemented as a transparent display. Specifically, the display 120 is made of a transparent material, and light outside the electronic apparatus 100 may penetrate the display 120 to reach the user, and the user may observe the user body and external environment by penetrating the display 120. The transparent display may be implemented as a transparent liquid crystal display (LCD) type, a transparent thin-film electroluminescent panel (TFEL) type, a transparent Organic Light Emitting Diode (OLED) type, or the like, and may be implemented in a form of displaying by projecting an image on a transparent screen (e.g., head-up display (HUD)). When the display 120 is implemented as a transparent display, the processor 130 may control the display 120 such that only virtual objects are displayed on the display 120.

The processor 130 may control overall operations and functions of the electronic apparatus 100. In particular, the processor 130 may render a virtual object based on the image captured by the camera 110, estimate a plurality of the user body detected using the pre-trained learning model when a user body is detected in the captured image, and generate an AR image by using estimated joint coordinates, the rendered virtual object, and the captured image, and control the display 120 to display the generated AR image.

The processor 130 may be electrically connected to the camera 110, and may receive data including the image captured by the camera 110 from the camera 110. The processor 130 may render a virtual object based on the image captured by the camera 110 (S220). Specifically, rendering may refer to generating a second image including a virtual object to correspond to a first image captured by the camera 110. In other words, rendering may mean generating a virtual object to correspond to a certain area of the captured image. Since the processor 130 renders a virtual object based on the captured image, the rendered virtual object may include depth information about space.

When the user body is detected from the captured image, the processor 130 may estimate a plurality of joint coordinates for the detected user body using a pre-trained learning model (S230). Specifically, the processor 130 may estimate the plurality of joint coordinates for the user body using RGB data included in the captured image. First, the processor 130 may detect a user body from the captured image, and the processor 130 may extract RGB data including the user body from the captured image. In addition, the processor 130 may estimate motions, shapes, and predicted coordinates of the user body by inputting the extracted RGB data. According to another embodiment, depth data may be included in an image captured by the camera 110 and estimated coordinates may be further estimated using the depth data.

The pre-trained learning model may be a learning model trained through a plurality of learning data including a hand image using a convolutional neural network (CNN). When the user body is a hand, a method of estimating joint coordinates using a learning model will be described below in detail with reference to FIGS. 4A and 4B.

The processor 130 may generate an AR image using the estimated joint coordinates, the rendered virtual object, and the captured image (S240). The AR image may refer to a third image generated by matching or calibrating the first image captured by the camera and the second image including the virtual object.

The processor 130 may control the display 120 to display the generated AR image. When the AR image is displayed on the display 120, the user may interact with the virtual object through the AR image. Specifically, the processor 130 may check whether the user body touches the virtual object based on the estimated joint coordinates, and perform an event corresponding to the object touch when the object touch is detected. The event may mean changing a transmittance of the virtual object. The processor 130 may change an alpha value of the virtual object included in the generated AR image by a unit of pixel.

When a touch of the user body and the virtual object is identified, the processor 130 may change the transmittance of the virtual object (S260). Alternatively, the processor 130 may change only the transmittance of an area of the virtual object corresponding to the touch. In other words, the processor 130 may change the transmittance of the virtual object by changing alpha values of all pixels corresponding to the virtual object or by changing only an alpha value of the pixel in the area of the virtual object.

Also, the processor 130 may identify an object touch based on whether the estimated joint coordinates are positioned at coordinates corresponding to the rendered virtual object. In addition, the processor 130 may track joint coordinates in real time or at a predetermined time interval through an image captured in real time by the camera 110. As described above with reference to FIG. 1, since only the image captured through one camera is used and only the plurality of joint coordinates for the user body are estimated by using RGB data of the captured image, the processor 130 may perform real-time image processing.

Figure 3:
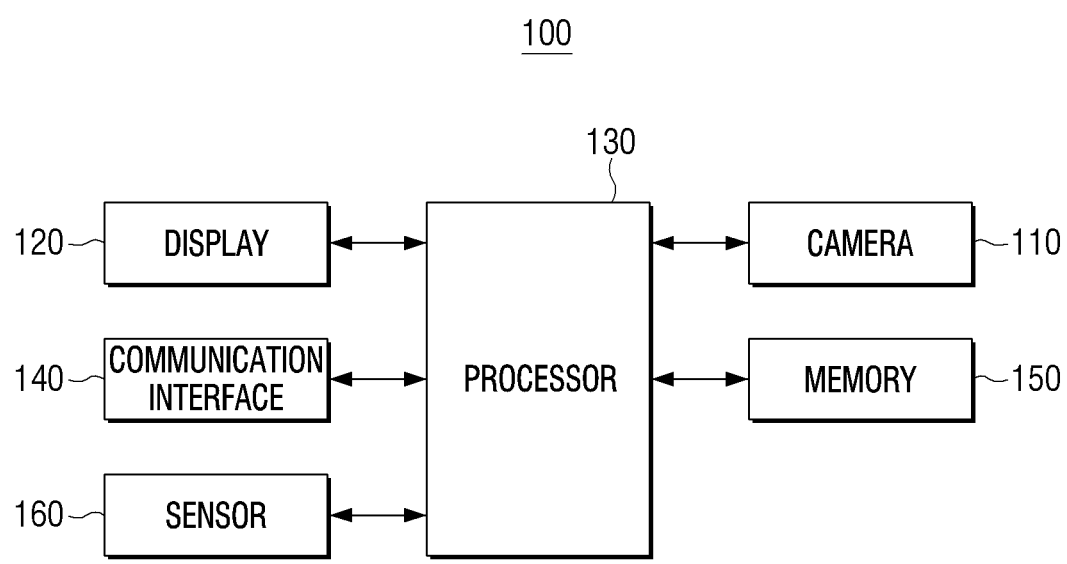
FIG. 3 is a block diagram illustrating a detailed configuration of an electronic apparatus according to an embodiment of the disclosure.

FIG. 3 is a block diagram illustrating a detailed configuration of an electronic apparatus according to an embodiment of the disclosure.

Referring to FIG. 3, the electronic apparatus 100 may include the camera 110, the display 120, the processor 130, a communication interface 140, a memory 150, and a sensor 160. Meanwhile, since the camera 110, the display 120, and the processor 130 illustrated in FIG. 3 have been described in FIG. 2, redundant description will be omitted.

The communication interface 140 may communicate with an external apparatus (not shown). The communication interface 140 may be connected to an external device through communication via a third device (e.g., a repeater, a hub, an access point, a server, a gateway, etc.).

In addition, the communication interface 140 may include various communication modules to perform communication with an external device. Specifically, the communication interface 140 may include an NFC module, a wireless communication module, an infrared module, and a broadcast receiving module.

The communication interface 140 may receive information related to the operation of the electronic apparatus 100 from an external device. According to an embodiment, the communication interface 140 may receive a learning model previously learned from an external server and device using the communication interface 140, and control the communication interface 140 to estimate coordinates of the user body using an external high-performance server and device. Further, the communication interface 140 may be used to update information stored in the electronic apparatus 100.

The memory 150, for example, may store a command or data regarding at least one of the other elements of the electronic apparatus 100. The memory 150 may be implemented as a non-volatile memory, a volatile memory, a flash memory, a hard disk drive (HDD) or a solid state drive (SDD). The memory 150 may be accessed by the processor 130, and perform readout, recording, correction, deletion, update, and the like, on data by the processor 130. According to an embodiment of the disclosure, the term of the storage may include the memory 150, read-only memory (ROM) (not illustrated) and random access memory (RAM) (not illustrated) within the processor 130, and a memory card (not illustrated) attached to the electronic apparatus 100 (e.g., micro secure digital (SD) card or memory stick). Also, the memory 150 may store a program, data, and the like for constituting various types of screens that will be displayed in the display area of the display 120.

In addition, the memory 150 may store data for displaying the AR image. Specifically, the memory 150 may store an image captured by the camera 110 and a second image including a virtual object generated by the processor 130. Also, the memory 150 may store the AR image generated based on the captured image and the rendered virtual object. Also, the memory 150 may store the plurality of joint coordinates of the user body estimated by the processor 130 in real time.

The sensor 160 may detect an object. Specifically, the sensor 160 may sense an object by sensing physical changes such as heat, light, temperature, pressure, sound, or the like. Also, the sensor 160 may output coordinate information about the sensed object. Specifically, the sensor 160 may acquire 3D point information of the sensed object or output coordinate information based on a distance.

For example, the sensor 160 may be a lidar sensor, a radar sensor, an infrared sensor, an ultrasonic sensor, a radio frequency (RF) sensor, a depth sensor, and a distance measurement sensor. The sensor 160 is a type of an active sensor and may transmit a specific signal to measure a time of flight (ToF). The ToF is a flight time distance measurement method, and may be a method of measuring a distance by measuring a time difference between a reference time point at which a pulse is fired and a detection time point of a pulse reflected back from a measurement object.

Figure 4A:
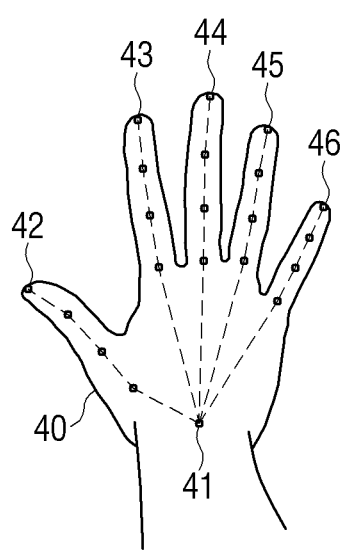
FIG. 4A is a view illustrating estimating process of a plurality of joint coordinates according to an embodiment of the disclosure.
Figure 4B:
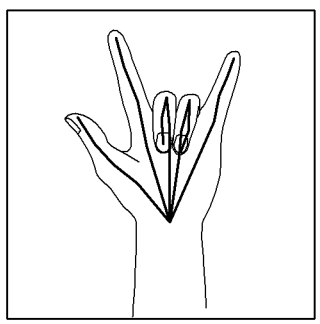
FIG. 4B is a view illustrating estimating process of a plurality of joint coordinates according to an embodiment of the disclosure.
Figure 4B:
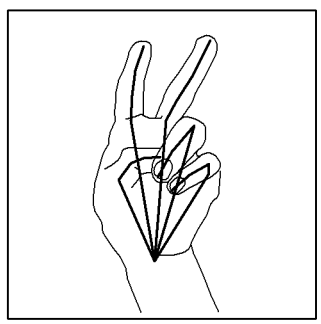

FIGS. 4A and 4B are views illustrating estimating process of a plurality of joint coordinates according to an embodiment of the disclosure.

Referring to FIG. 4A, a user body 40, a plurality of joint coordinates 41 to 46 corresponding to a finger joint and a palm are illustrated.

Referring to FIG. 4B, a hand image to which a plurality of joint coordinates 41 to 46 of FIG. 4A are connected when the hand is illustrated in a plurality of configurations.

If the user body detected from an image captured by the camera 110 is a hand, the electronic apparatus 100 may use a pre-trained learning model as a method of estimating a plurality of joint coordinates corresponding to a finger joint and a palm.

The learning model may be trained through a plurality of learning data or training data including a human hand image using a convolutional neural network (CNN). The learning data may be learned based on data in which 3D coordinates are input to at least one region of the hand image and data in which the 3D coordinates are not matched to the hand image. First, data input with 3D coordinates in at least one region of the hand image may be learned using a learning model. Subsequently, output data may be obtained from the learning model using data in which the 3D coordinates are not matched to the hand image, and a loss function or error between the output data and the data in which 3D coordinates are input in at least one region of the hand image may be calculated. The learning model may be trained through a process of updating a weight value of the CNN using the calculated loss function or error.

Referring again to FIG. 4A, the learning data or training data may be a hand image in which 3D coordinates are assigned to a plurality of joints including a fingertip and a finger joint.

Referring again to FIG. 4B, the learning model may be formed by machine learning or may be learned through deep learning after inputting 21 coordinates, respectively, as shown in FIG. 4A in each of the hand images including various hand shapes and size. In other words, the hand image illustrated in FIG. 4B may be learning data or training data for learning the learning model.

FIG. 4A shows a user body 40 composed of 20 points corresponding to each finger and one point corresponding to the palm, a total of 21 points, are illustrated. The 21 points included in the user body 40 may be the basis for estimating a plurality of joint coordinates for the user body.

For example, when the learning model is trained using experimental data or learning data that includes more than 21 points included in the user body 40 of FIG. 4A, the electronic apparatus 100 may more accurately grasp the user body joint coordinates and locations included in the captured image. However, the number of points included in the user body 40 of FIG. 4A is only an embodiment, and the number of points set according to the performance of the electronic apparatus 100 may be appropriately selected in the range of 5 to 40 during implementation.

As shown in FIG. 4B, the plurality of hand images may be learning data or training data for learning the learning model. The electronic apparatus 100 may estimate the joint coordinates of the user by learning the hand image illustrated in FIG. 4B. In particular, the electronic apparatus 100 may estimate coordinates of hidden finger with only a part of the captured image even when a part of the hand, for example, fingers are hidden by another object or subject.

For example, it may be assumed that the learning model learns the data of FIG. 4B and a finger image similar to the data of FIG. 4B is given. In this case, according to the prior art, RGB and depth data for the fingers hidden by another object or subject may not be obtained, and accurate coordinates for the hidden fingers may not be obtained with only given data. However, the electronic apparatus 100 according to the disclosure may estimate coordinates using a pre-trained learning model for fingers hidden by other objects or subjects. However, the above example is an example for convenience of description, and data related to all movements and postures of the hand are not required to estimate the coordinates of the hand according to an embodiment of the disclosure.

Figure 5:
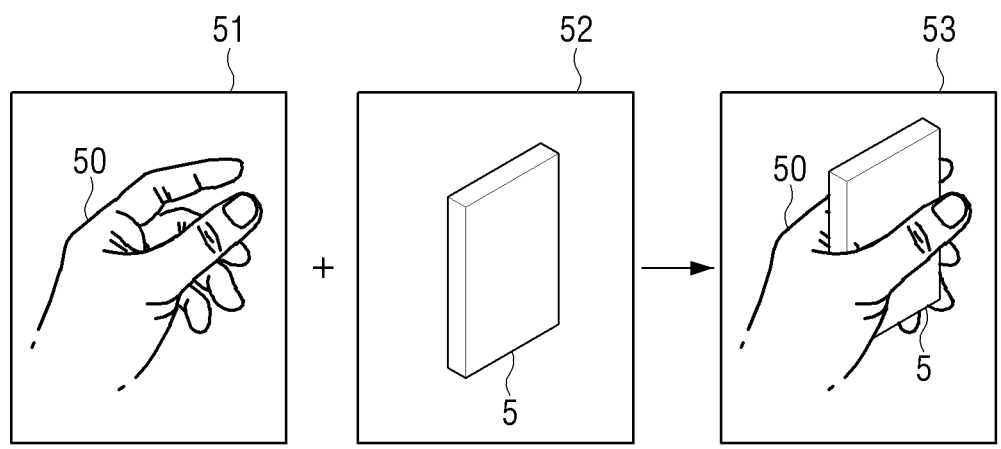
FIG. 5 is a view illustrating an AR image displayed by an electronic apparatus according to an embodiment of the disclosure.

FIG. 5 is a view illustrating an AR image displayed by an electronic apparatus according to an embodiment of the disclosure.

Referring to FIG. 5, a first image 51 including a user body 50, a second image 52 including a virtual object 5, and a third image 53 including a user body 50 and a virtual object 5 are illustrated.

The first image 51 may be an image captured by a camera included in the electronic apparatus 100. Specifically, the rear of the electronic apparatus 100 may by captured by the camera included in the electronic apparatus 100, and the captured image may include the user body 50. The user body 50 captured by the camera is illustrated in the first image 51.

In addition, the second image 52 may be an image generated by the virtual object 5 rendered by the electronic apparatus 100 based on the captured image so as to correspond to the first image captured by the camera included in the electronic apparatus 100. Since the virtual object 5 rendered by the electronic apparatus 100 is generated based on the captured image, depth information on space may be included.

The third image 53 may be an image generated by the first image 51 and the second image 52 being matched and calibrated by the electronic apparatus 100.

Specifically, the electronic apparatus 100 may extract RGB data including the user body from the first image captured by the camera included in the electronic apparatus 100. Then, the electronic apparatus 100 may estimate motions, shapes, and predicted coordinates of the user body by inputting the extracted RGB data. Alternatively, the electronic apparatus 100 may include depth data in the captured image, and estimate a plurality of joint coordinates for the user body by using the depth data.

For example, the electronic apparatus 100 may detect a hand of the user body 50 included in the first image 51, and estimate coordinates of the user body 50 detected by using the pre-trained learning model. Alternatively, the electronic apparatus 100 may estimate the coordinates of the user body 50 by additionally using the depth data of the user body 50 from the captured image.

The electronic apparatus 100 may match or calibrate the first image 51 and the second image 52 by using the estimated joint coordinates of the user body 50 and the depth information of the virtual object 5. Since the electronic apparatus 100 may generate an augmented reality image using the estimated coordinates of the user body and the coordinates of the virtual object, the user may be able to interact with the virtual object displayed through the display of the electronic apparatus 100.

Figure 6:
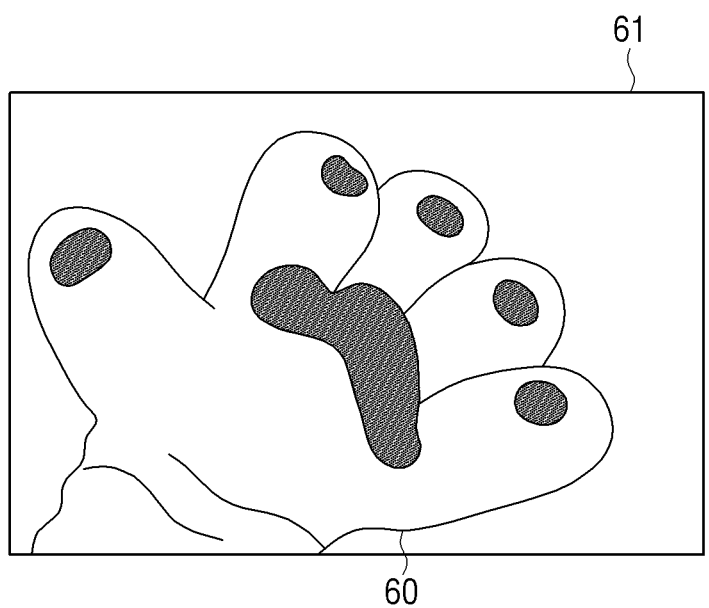
FIG. 6 is a view illustrating a process of rendering a virtual hand object on a user body according to an embodiment of the disclosure.

FIG. 6 is a view illustrating a process of rendering a virtual hand object on a user body according to an embodiment of the disclosure.

Referring to FIG. 6, an augmented reality image 61 including a virtual hand object 60 is illustrated. As described above, the electronic apparatus 100 may estimate a plurality of joint coordinates for the user body, and render a virtual hand object based on the estimated plurality of joint coordinates.

Specifically, the electronic apparatus 100 may detect the user's hand from the captured image and estimate the plurality of joint coordinates for the detected user's hand. The electronic apparatus 100 may render a virtual hand object at coordinates corresponding to the estimated plurality of joint coordinates, and the electronic apparatus 100 may output a virtual hand object instead of the user body. The electronic apparatus 100 may track movements of the user's hand in real time, and the electronic apparatus 100 superimposes a virtual hand object on the user's hand, so that the user may move the virtual hand object 60 in the augmented reality image 61 just like moving the user's hand, and interact with the virtual object.

When the electronic apparatus 100 detects an object touch, at least one of a user body or a virtual object may be transparently displayed. An embodiment in which the electronic apparatus 100 transparently displays a virtual object or a user body will be described with reference to FIGS. 7 and 9.

Figure 7:
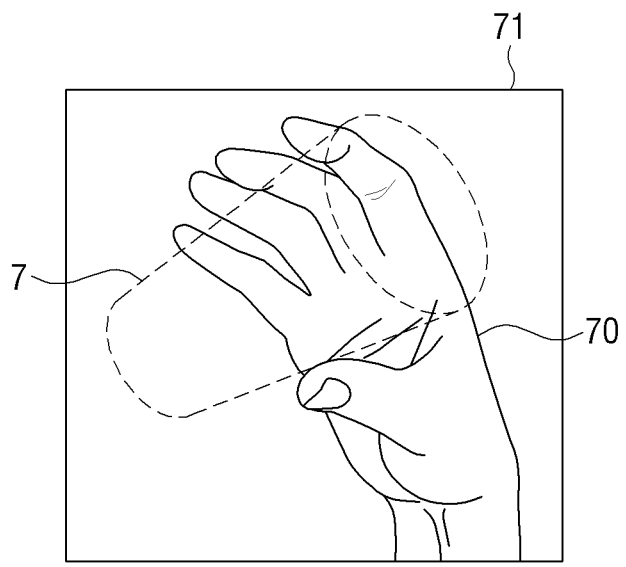
FIG. 7 is a view illustrating an event corresponding to an object touch according to an embodiment of the disclosure.

FIG. 7 is a view illustrating an event corresponding to an object touch according to an embodiment of the disclosure.

Referring to FIG. 7, an augmented reality image 71 including a virtual object 7 and a user body 70 is illustrated. The electronic apparatus 100 may identify whether the user body 70 touches the virtual object 7 based on the estimated joint coordinates, and perform an event corresponding to the object touch when the object touch is detected. The event may refer to changing a transmittance of the virtual object 7 or a color of the displayed virtual object 7. Meanwhile, the electronic apparatus 100 may change an alpha value of the virtual object 7 included in the generated augmented reality image 71 by a unit of pixel. When a touch of the user body 70 and the virtual object 7 is identified, the electronic apparatus 100 may change the transmittance of the virtual object 7. Alternatively, the electronic apparatus 100 may change only the transmittance of an area of the virtual object 7 corresponding to the touch. In other words, the electronic apparatus 100 may change the transmittance of the virtual object by changing the alpha values of all pixels corresponding to the virtual object 7 or by changing only the alpha values of pixels in one region of the virtual object 7.

Figure 8:
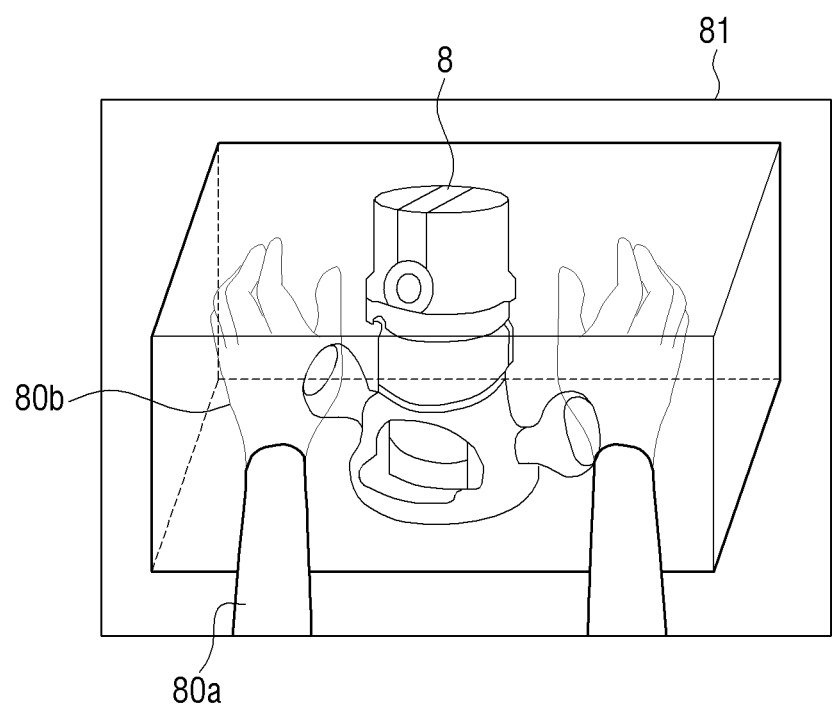
FIG. 8 is a view illustrating an object touch according to an embodiment of the disclosure.

FIG. 8 is a view illustrating an object touch according to an embodiment of the disclosure.

Referring to FIG. 8, an augmented reality image 81 including a virtual object 8 and user bodies 80a and 80b is illustrated. The electronic apparatus 100 may identify whether the user body 80a and 80b touch the virtual object 8 based on the estimated joint coordinates, and perform an event corresponding to the object touch when the object touch is detected. The event may refer to changing a transmittance of the rendered virtual hand object 80b.

Meanwhile, the electronic apparatus 100 may change an alpha value of the virtual hand object 80b included in the generated augmented reality image by a unit of pixel. The electronic apparatus 100 may change a transmittance of the virtual hand object 80b when a touch of the user bodies 80a and 80b and the virtual object 8 is identified. Alternatively, the electronic apparatus 100 may change only the transmittance of one area of the virtual hand object 80b corresponding to the touch.

Specifically, referring to FIG. 8, the virtual object 8 may be rendered by the electronic apparatus 100 and occupy a certain area in space (e.g., an area of a certain size of a cuboid). In addition, the electronic apparatus 100 may grasp 3D coordinates of the virtual object 8 and also estimate the 3D coordinates of the user bodies 80a and 80b. In other words, the electronic apparatus 100 may identify whether to touch the object by comparing the 3D coordinates of the virtual object 8 and the user's bodies 80a and 80b. In addition, the electronic apparatus 100 may identify whether a part of the user's bodies 80a and 80b touches the virtual object 8. The electronic apparatus 100 may change a transmittance of a part area (the virtual hand object 80b) of the user body determined to have generated object touch with the virtual object 8, or reverse the color of the rendered virtual hand object 80b.

FIG. 9 is a flowchart illustrating a method of controlling an electronic apparatus according to an embodiment of the disclosure.

Referring to FIG. 9, the electronic apparatus 100 may include a camera, a display, and a processor. The electronic apparatus 100 may capture a rear of the electronic apparatus 100 facing a front of which the display displays an image (S910). The front and the rear are described for convenience of description, and may be first and second surfaces.

The electronic apparatus 100 may render a virtual object based on the captured image (S920). Specifically, when an image captured by the camera is referred to as a first image or a first layer, the electronic apparatus 100 may generate a second image or a second layer including a virtual object based on the first image or the first layer.

When the user body is detected from the captured image, the electronic apparatus 100 may estimate a plurality of joint coordinates for the detected user body using a pre-trained learning model (S930). Specifically, when the user body detected from the captured image is a hand, the electronic apparatus 100 may estimate a plurality of joint coordinates corresponding to the finger joint and the palm by using the pre-trained learning model. The pre-trained learning model may be learned through a plurality of learning data including hand images.

The electronic apparatus 100 may generate an augmented reality image using the estimated plurality of joint coordinates, the rendered virtual object, and the captured image (S940). The electronic apparatus 100 may display the generated augmented reality image (S950). The electronic apparatus 100 may identify whether the user body touches the virtual object in the displayed augmented reality image, and perform an event corresponding to the object touch when the object touch is detected. In particular, the electronic apparatus 100 may identify whether the user body touches the virtual object based on the estimated joint coordinates, and change a transmittance of the virtual object when the touch is confirmed (S960). The electronic apparatus 100 may change an alpha value of the virtual object included in the generated augmented reality image by a unit of pixel, and the electronic apparatus 100 may identify an object touch based on whether the estimated joint coordinates are located at coordinates corresponding to the rendered virtual object. Also, the electronic apparatus 100 may change only the transmittance of an area of the virtual object corresponding to the touch. In other words, the electronic apparatus 100 may change the transmittance of the virtual object by changing the alpha value of all pixels corresponding to the virtual object or by changing only the pixel alpha value of the area of the virtual object.

The term "module" as used herein includes units made up of hardware, software, or firmware, and may be used interchangeably with terms such as logic, logic blocks, components, or circuits. A "module" may be an integrally constructed component or a minimum unit or part thereof that performs one or more functions. For example, the module may be composed of an application-specific integrated circuit (ASIC).

The various example embodiments described above may be implemented as an S/W program including an instruction stored on machine-readable (e.g., computer-readable) storage media. The machine is an apparatus which is capable of calling a stored instruction from the storage medium and operating according to the called instruction, and may include an electronic apparatus (e.g., an electronic apparatus A) according to the above-described example embodiments. When the instruction is executed by a processor, the processor may perform a function corresponding to the instruction directly or using other components under the control of the processor. The command may include a code generated or executed by a compiler or an interpreter. A machine-readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

The respective components (e.g., module or program) according to the various example embodiments may include a single entity or a plurality of entities, and some of the corresponding sub-components described above may be omitted, or another sub-component may be further added to the various example embodiments. Alternatively or additionally, some components (e.g., module or program) may be combined to form a single entity which performs the same or similar functions as the corresponding elements before being combined. Operations performed by a module, a program module, or other component, according to various embodiments, may be sequential, parallel, or both, executed iteratively or heuristically, or at least some operations may be performed in a different order, omitted, or other operations may be added.

What is claimed is:

1. An electronic apparatus comprising:
a display;
a camera in which the display displays an image; and
a processor configured to:
generate a first layer based on the image captured by the camera,
generate a second layer comprising a virtual object based on the first layer,
based on a user body being detected from the captured image, estimate a plurality of joint coordinates with respect to the detected user body using a pre-trained learning model,
generate an augmented reality image using the estimated plurality of joint coordinates, the first layer, and the second layer,
control the display to display the generated augmented reality image,
identify whether the detected user body touches the virtual object based on the estimated plurality of joint coordinates, and
change a transparency of one area corresponding to the touch of the virtual object on the second layer based on whether the user body touches the virtual object at the estimated joint coordinates.

2. The apparatus of claim 1, wherein the processor is further configured to estimate the plurality of joint coordinates corresponding to a finger joint and a palm using the pre-trained learning model based on the detected user body being identified to be a hand.

3. The apparatus of claim 1, wherein the processor is further configured to change a transparency of the user body and transparently display the user body, based on the touch being identified.

4. The apparatus of claim 1, wherein the processor is further configured to:
receive depth data of the captured image from the camera, and
generate the augmented reality image using the received depth data.

5. The apparatus of claim 1, wherein the pre-trained learning model is configured to be trained through a plurality of learning data comprising hand images by using a convolutional neural network (CNN).

6. The apparatus of claim 5,
wherein the plurality of learning data comprises first data in which a 3D coordinate is matched to at least one area of a hand image, and second data in which the 3D coordinate is not matched to the hand image, and
wherein the pre-trained learning model is configured be trained by updating a weight value of the CNN based on the first data and the second data.

7. The apparatus of claim 1, wherein the processor is further configured to change the transparency of one area of the virtual object by changing an alpha value of a pixel in one area of the virtual object.

8. A method of controlling an electronic apparatus comprising:
capturing an image via a camera;
generating a first layer based on the image captured by the camera;
generating a second layer comprising a virtual object based on the first layer;
based on a user body being detected from the captured image, estimating a plurality of joint coordinates with respect to the detected user body using a pre-trained learning model;
generating an augmented reality image using the estimated plurality of joint coordinates, the first layer, and the second layer;
displaying the generated augmented reality image;
identifying whether the user body touches the virtual object based on the estimated plurality of joint coordinates; and
changing a transparency of one area corresponding to the touch of the virtual object on the second layer based on whether the user body touches the virtual object at the estimated joint coordinates.

9. The method of claim 8, wherein the estimating comprises estimating a plurality of joint coordinates corresponding to a finger joint and a palm using the pre-trained learning model based on the detected user body being identified to be a hand.

10. The method of claim 8, further comprising:
changing a transparency of the user body and transparently displaying the user body based on the touch being identified.

11. The method of claim 8, wherein the generating comprises receiving depth data of the captured image from a camera, and generating the augmented reality image using the received depth data.

12. The method of claim 8, wherein the pre-trained learning model is configured to be trained through a plurality of learning data comprising hand images by using a convolutional neural network (CNN).

13. The method of claim 12,
wherein the plurality of learning data comprises a first data in which a 3D coordinate is matched to at least one area of a hand image, and a second data in which the 3D coordinate is not matched to the hand image, and
wherein the pre-trained learning model is configured be trained by updating a weight value of the CNN based on the first data and the second data.

14. The method of claim 9, wherein the changing of the transparency comprises change the transparency of one area of the virtual object by changing an alpha value of a pixel in one area of the virtual object.

15. The method of claim 8, wherein the identify of whether the user body touches the virtual object comprises identifying whether the estimated plurality of joint coordinates are positioned at coordinates corresponding to the virtual object.

16. The method of claim 9, wherein the estimated plurality of joint coordinates comprise an estimate of coordinates of a hidden finger when a part of the hand is hidden by another object or subject.

* * * * *